(12) United States Patent
Arakawa et al.

(10) Patent No.: US 6,778,237 B2
(45) Date of Patent: Aug. 17, 2004

(54) POLARIZING ELEMENT

(75) Inventors: Kohei Arakawa, Fujinomiya (JP); Mitsuyoshi Ichihashi, Fujinomiya (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 374 days.

(21) Appl. No.: 09/764,127

(22) Filed: Jan. 19, 2001

(65) Prior Publication Data

US 2001/0017676 A1 Aug. 30, 2001

(30) Foreign Application Priority Data

Jan. 21, 2000 (JP) ........................................ 2000-012464

(51) Int. Cl.$^7$ ........................ G02F 1/1335; G02F 1/13
(52) U.S. Cl. ........................ 349/100; 349/96; 349/194; 359/500
(58) Field of Search .................... 349/96, 99, 100, 349/194, 9, 37; 359/500

(56) References Cited

U.S. PATENT DOCUMENTS

| | | | | |
|---|---|---|---|---|
| RE33,120 E | * | 11/1989 | Nagae et al. | 349/37 |
| 4,985,285 A | * | 1/1991 | Ichikawa et al. | 428/1 |
| 6,344,889 B1 | * | 2/2002 | Hasegawa et al. | 349/129 |

FOREIGN PATENT DOCUMENTS

JP          6-281814          10/1994

* cited by examiner

*Primary Examiner*—Dung Nguyen
(74) *Attorney, Agent, or Firm*—Burns, Doane, Swecker & Mathis, L.L.P.

(57) ABSTRACT

A polarizing element provided with a layer including liquid crystals and a polarizer having a transmission axis. The polarizing element of the present invention is structured such that liquid crystal molecules in the aforementioned liquid crystal layer have a chiral smectic texture of a helical configuration with respect to a axis, the axis is not along a direction normal to a surface of the liquid crystal layer (a z-direction), and a direction of an orthogonal projection of the axis onto the surface of the liquid crystal layer is substantially at 90° to the polarizer's transmission axis.

12 Claims, 3 Drawing Sheets

Natural Light

POLARIZING ELEMENT

BACKGROUND OF THE INVENTION

1. Field of the Invention

The present invention relates to a polarizing element that can be used for display devices in various fields, such as personal computers, audio-visual equipment, mobile data communication devices, video games, simulation devices, car navigation systems and the like.

2. Description of the Related Art

Liquid crystal display devices that are used in displays for computers and the like modulate linearly polarized light and display an image. In conventional liquid crystal display devices, linearly polarized light was obtained by transmission of natural light at a polarizing plate formed of iodine-type elements or dichromatic-type elements. Hence, 50% of the natural light was absorbed and light utilization factors were low. This resulted in the problem of displays being dark. Moreover, the absorbed light energy was converted to heat energy, which could adversely affect the polarization characteristics of the polarizing plate. In light of these facts, it was hoped to improve luminance in liquid crystal display devices by, for example, using a prism sheet provided with a row of prisms. The prism sheet improved luminance by concentrating light paths to within an angle of visibility. However, the fact that any natural light having a particular polarization was absorbed at the polarizing plate could not be overcome thereby.

Consequently, various methods have been suggested to improve light utilization factors by splitting polarization components of natural light and then transmitting one component, reflecting another component and re-using the reflected light.

For example, WO92/22,938 (Japanese National Publication No. 6-508449) proposed a polarized beam splitting sheet formed by two prism sheets stuck together with prism surfaces facing each other. Each prism sheet was formed by a row of triangular prisms, and surfaces of the prisms were plurally laminated with thin films having mutually different refractive indexes (a large refractive index and a small refractive index). In this polarized beam splitting sheet, theoretically, natural light was incident at the Brewster angle. Accordingly, a p-polarization component was transmitted, and an s-polarization component was repeatedly reflected at thin film boundaries and re-used. Thus, the light utilization factor was improved. However, the thin films on the prism surfaces were formed using vapor deposition. Thus, production processes were complicated and production costs were extremely high. Because of these problems, this polarized beam splitting sheet was not implemented.

Further, WO95/17,303 Japanese National Publication No. 9-506837) has disclosed a polarized beam splitting sheet with multiply laminated oriented films having mutually different refractive indexes (a large refractive index and a small refractive index). This was marketed under the product name, "DBEF". The polarized beam splitting sheet formed by this multi-layered film was effective in improving the light utilization factor. However, the sheet was formed by laminating several hundred thin film layers. Thus, production processes were complicated. Also, there was a problem in that, when film was being cut to a predetermined shape, offcuts generated large amounts of dust. In yet another technique, disclosed in Japanese Patent Application Laid-Open (JP-A) No. 6-281814, a cholesteric liquid crystal layer and a ¼-wave plate were combined. The cholesteric liquid crystal layer split two circularly polarized components and the ¼-wave plate converted circularly polarized light to linearly polarized light. This technique improved the light utilization factor. However, because a cholesteric liquid crystal layer and a ¼-wave plate were required, production costs were a problem.

SUMMARY OF THE INVENTION

The present invention is provided to solve the above-described conventional problems and an object of the present invention is to provide a polarizing element that can be produced at low cost and that can convert natural light to linearly polarized light with a high light utilization factor, The above object of the present invention can be achieved by a polarizing element comprising a layer including liquid crystal molecules and a polarizer having a transmission axis, wherein the liquid crystal molecules have a chiral smectic texture of a helical configuration, the axis of the molecular helix of the helical configuration is along a direction other than a direction normal to a surface of the layer, and a direction of an orthogonal projection of the axis onto the surface of the layer is substantially at 90° with respect to the transmission axis of the polarizer.

In one aspect of the polarizing element of the present invention, the layer has a chiral smectic C texture.

In another aspect of the polarizing element of the present invention, the chiral smectic texture is formed by liquid crystal molecules to be fixed one of physically and by a chemical reaction.

In another aspect of the polarizing element of the present invention, the chiral smectic texture of the helical configuration is formed by liquid crystal molecules to be fixed one of physically and by a chemical reaction.

In another aspect of the polarizing element of the present invention, the polarizer is one of an iodine-type polarizing plate, a dye-type polarizing plate and a polyvinylene-type polarizing plate, and the polarizer has a degree of polarization of at least 98%.

In another aspect of the polarizing element of the present invention, the layer is formed on a transparent substrate.

In another aspect of the polarizing element of the present invention, the transparent substrate is formed by one of a cellulose-type resin, a norbornene-type resin and a polycarbonate-type resin.

In another aspect of the polarizing element of the present invention, the transparent substrate also serves as a protective film for the polarizer.

In another aspect of the polarizing element of the present invention, of natural light that is incident from the direction normal to the surface of the layer, a linearly polarized light component whose vibration direction is substantially at 90° to the orthogonal projection is transmitted and a vibration direction of a linearly polarized light component whose vibration direction is substantially parallel to the orthogonal projection is substantially altered by 90° to be transmitted In another aspect of the polarizing element of the present invention, the axis forms an oblique angle of from 5° to 90° with respect to the direction normal to the surface of the layer.

The above object of the present invention can be also achieved by a polarizing element comprising a layer including liquid crystal molecules and a polarizer having a transmission axis, wherein the liquid crystal molecules have a chiral smectic C texture of a helical configuration, the axis of the molecular helix of the helical configuration is along a direction other than a direction normal a surface of the layer, a direction of an orthogonal projection of the axis onto the surface of the layer is substantially at 90° with respect to the transmission axis of the polarizer, and, of natural light that is incident from the direction normal to the surface of the layer, a linearly polarized light component whose vibration direction is substantially at 90° to the orthogonal projection is transmitted and a vibration direction of a linearly polarized light component whose vibration direction is substantially parallel to the orthogonal projection is substantially altered by 90° to be transmitted.

In one aspect of the polarizing element of the present invention, the chiral smectic C configuration is formed by liquid crystal molecules to be fixed one of physically and by a chemical reaction.

In the polarizing element of the present invention, natural light is incident from a direction normal to a layer formed of liquid crystal molecules. This liquid crystal layer has a specific chiral smectic texture of helical configuration, and particularly preferably has a chiral smectic C texture. The natural light can be converted to linearly polarized light by this structure. A conventional method for improving light utilization factors of polarizing elements is known in which, of two linearly polarized components included in natural light, one is transmitted and another is reflected, and, after being returned, a portion of the reflected light is added to transmitted light. A further method is known in which the two linearly polarized components of natural light are split and one component is transmitted through a ½-wave plate so as to align vibration directions of the two components. That is, these conventional methods convert natural light to linearly polarized light by splitting the two linearly polarized components of the natural light and either returning one of the thus split components or using a ½-wave plate. The polarizing element of the present invention is completely different from the conventional methods in that the polarizing element of the present invention can convert natural light to linearly polarized light in a single pass. Consequently, with the present invention, linearly polarized light can be obtained from natural light with a simpler architecture and higher efficiency. Moreover, when the present invention is used in a screen display or the like, both a great reduction in costs and an increase in display luminance can be achieved.

Furthermore, by combining the present invention with a conventionally used iodine-type, dye-type or polyvinylene-type polarizer, a polarizing element with a high luminance and a high degree of polarization can be formed. Therefore, when such polarizing elements are used for liquid crystal display elements, a high contrast display can be effectively obtained. In a method for combining the present invention with a conventional polarizer, an orthogonal projection of a chiral smectic axis is preferably substantially perpendicular to a transmission axis of the polarizer. Specifically, an angle between the orthogonal projection and the transmission axis is preferably from 60° to 120°, more preferably from 80° to 100°, and particularly preferably from 85° to 95°.

DESCRIPTION OF THE PREFERRED EMBODIMENTS

Figure 1:
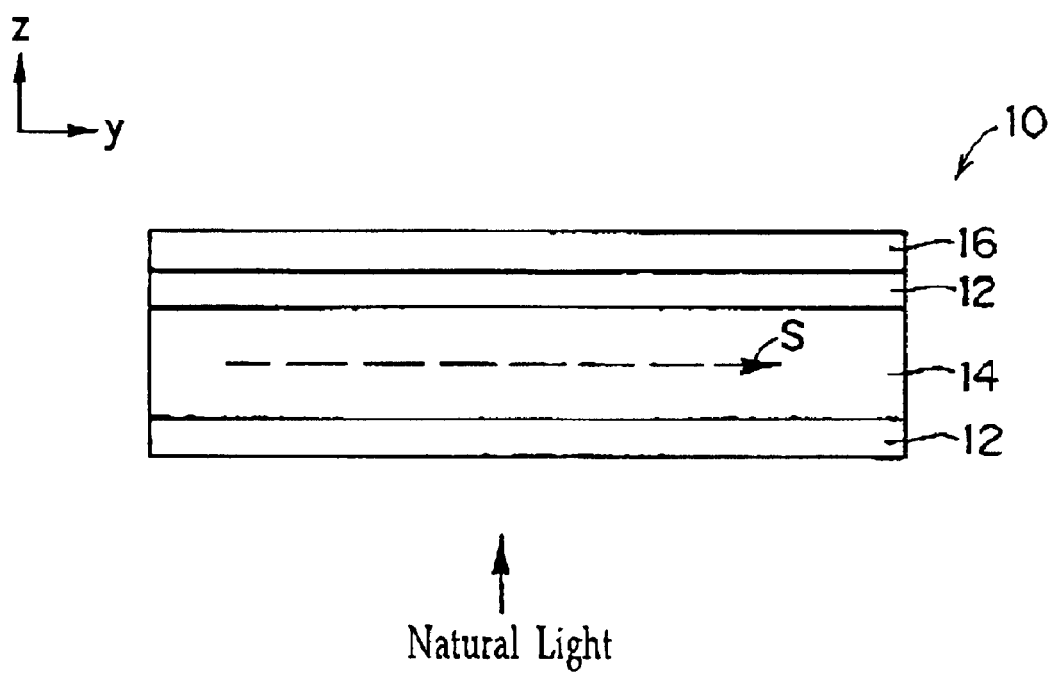
FIG. 1 is a schematic sectional view of a polarizing element relating to an embodiment of the present invention.

FIG. 1 shows an embodiment of a polarizing element of the present invention.

A polarizing element 10 shown in FIG. 1 has a pair of transparent substrates 12 and a layer 14 sandwiched therebetween. The layer 14 is formed of liquid crystal molecules that have a chiral smectic texture of a helical configuration. The liquid crystal molecules in the layer 14 are oriented so as to have an axis s, which is not aligned with a direction normal to the layer 14. A polarizing plate 16 is disposed at a light emission side of the layer 14. A transmission axis t of the polarizing plate 16 substantially forms a 90° angle with an orthogonal projection s' of the axis s onto the layer 14.

Figure 2A:
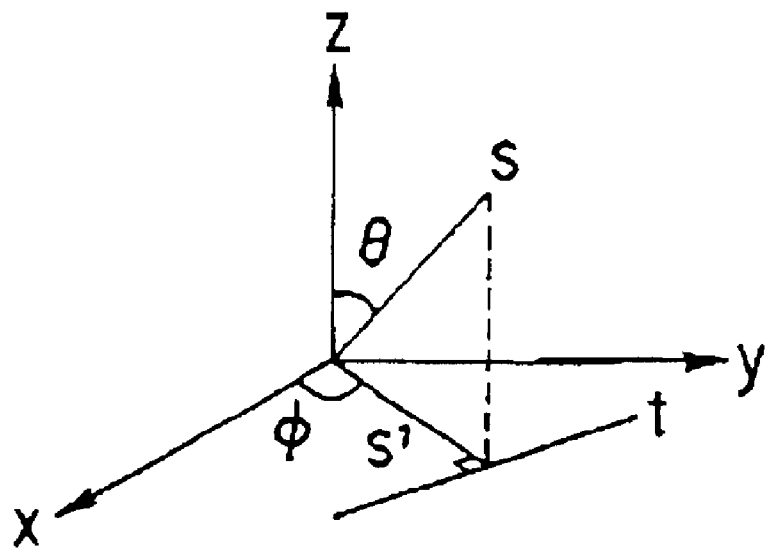
FIG. 2A is a schematic diagram used for explaining a positional relationship between a liquid crystal layer surface and a axis of the polarizing element relating to the embodiment of the present invention.

FIG. 2A shows coordinate axes illustrating relationships of the axis s of the layer 14, the axis orthogonal projection s' and the transmission axis t of the polarizing plate 16. Axes within surfaces of the layer 14 (and of the transparent substrates 12) are designated x and y, and a direction normal to the surface of the layer 14 is designated z. The axis s forms a predetermined oblique angle θ(≠0°) with the z axis. The oblique angle θ is preferably from 5° to 90°, more preferably from 35° to 90° and even more preferably from 60° to 90°. Also, the axis orthogonal projection s' of the axis s onto the layer 14 (onto the x-y plane) substantially forms a 90° angle with the transmission axis t of the polarizing plate 16.

Figure 2B:
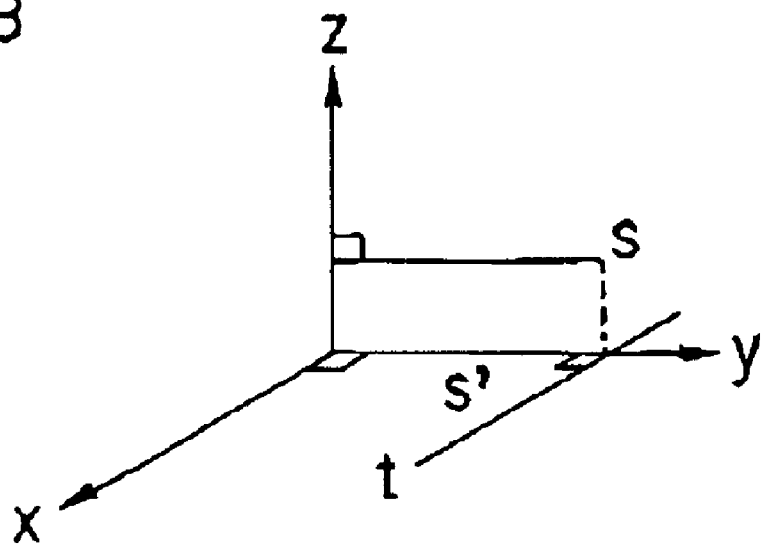
FIG. 2B is a schematic diagram used for explaining a positional relationship between the liquid crystal layer surface and the axis of the polarizing element relating to the embodiment of the present invention.

Next, polarization function of the polarizing element 10 is explained for a case in which the axis s, the axis orthogonal projection s' and the transmission axis t have the relationship shown in FIG. 2B; i.e., the layer 14 is such that θ=90° and an angle φ=90° (the axis s is parallel to the y axis), and natural light is incident along the z direction.

The natural light incident on the polarizing element 10 along the z direction is converted to linearly polarized light by the aforementioned chiral smectic configuration in the layer 14. Of linearly polarized light components included in the natural light, a linearly polarized light component having a vibration direction that is substantially at 90° to the axis orthogonal projection s' (herein called p-polarized light) is transmitted unaltered, while a vibration direction of a linearly polarized light component whose vibration direction is parallel to the axis orthogonal projection s' (herein called s-polarized light) is altered by 90° and transmitted. Then the thus transmitted light is transmitted through the polarizing plate 16, thereby further increasing a degree of polarization of the light. Namely, the polarizing element 10 converts natural light to linearly polarized light in a single pass. Because the polarizing element 10 has a simple structure, preparation costs are low, in addition to which natural light is converted to linearly polarized light highly efficiently. Consequently, when the polarizing element 10 is used in a display, both a reduction in costs and an increase in display luminance can be achieved.

Various liquid crystal molecules that assume a chiral smectic texture of a helical configuration can be utilized as the liquid crystal molecules in the polarizing element of the present invention. The effects of the present invention are not attributable to the chemical structure of the liquid crystal molecules but to the physical structure implemented by the same (namely, the chiral smectic texture of a helical configuration). Therefore, as well as conventionally known liquid crystal molecules that exhibit chiral smectic phases, yet to be discovered liquid crystal molecules that exhibit chiral smectic phases can be utilized.

Various methods can be used to put the liquid crystal molecules into a desired orientation and form the layer having the chiral smectic texture of the helical configuration. For example, aligning material can be formed on facing surfaces of the pair of transparent substrates, the liquid crystal molecules injected between the substrates, and orientation curing carried out. In this method, the oblique angle $\theta$ between the axis s of the chiral smectic texture of the helical configuration and the z axis can be adjusted to within a desired range by control of surface energy of the aligning material or by implementation of a rubbing treatment along the desired direction of the aligning material. This rubbing treatment can be carried out by scraping along the specified direction a number of times with paper or cloth. Further, the aligning material may be formed on the transparent substrates, or the aligning material may be formed on other plates, with the chiral smectic texture of the helical configuration layer being formed on these aligning material and then transferred therefrom to the transparent substrates.

In the present invention, the chiral smectic texture of the helical configuration layer may have the form of a liquid crystal cell, wherein a composition containing liquid crystal molecules is simply sealed between a pair of transparent substrates, or the liquid crystal molecules may have a form that is physically or chemically fixed. It is preferable for the liquid crystal molecules to be fixed, because durability thereof will be better in cases of utilization in components for use in high temperature environments and the like. Accordingly, the present invention includes forms of liquid crystal molecules wherein the liquid crystal molecules are fixed and have already lost liquid crystal properties. For chemical fixing, that is to say, fixing by means of a chemical reaction, introducing a reactive radical to the liquid crystal molecules and causing a cross-linking reaction to proceed with heat, light or the like is an effective fixing method. For physical fixing methods, there are methods that utilize thermotropic characteristics exhibited by liquid crystal molecules.

Specific examples of liquid crystal molecules having reactive radicals that are utilizable for the present invention are shown below. Liquid crystal molecules that can be used in the present invention are not limited to the specific examples below.

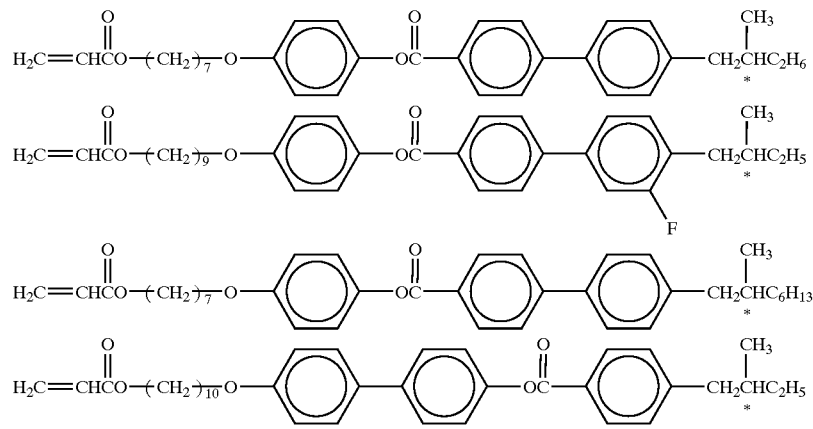

Liquid crystal molecules that exhibit smectic A and/or smectic C configurations and that do not have asymmetric carbon may, as desired, be combined with the liquid crystal molecules that exhibit the chiral smectic texture of the helical configuration. Also, other liquid crystal molecules and molecules that do not independently exhibit liquid crystal characteristics may, as desired, be combined with the chiral smectic texture of the helical configuration liquid crystal molecules, to the extent that such combinations do not disrupt the desired orientation. If a combination of liquid crystal molecules and the like has reactive radicals within molecules thereof, chemical fixing of the liquid crystal molecules is possible. In this case, chemical fixing is preferable. Specific examples of liquid crystal molecules that can be combined and that have reactive radicals that can be utilized for the present invention are shown below. Liquid crystal molecules that can be used in the present invention are not limited to the specific examples below.

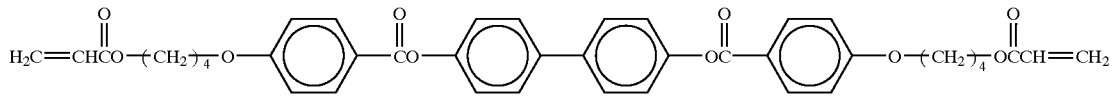

-continued

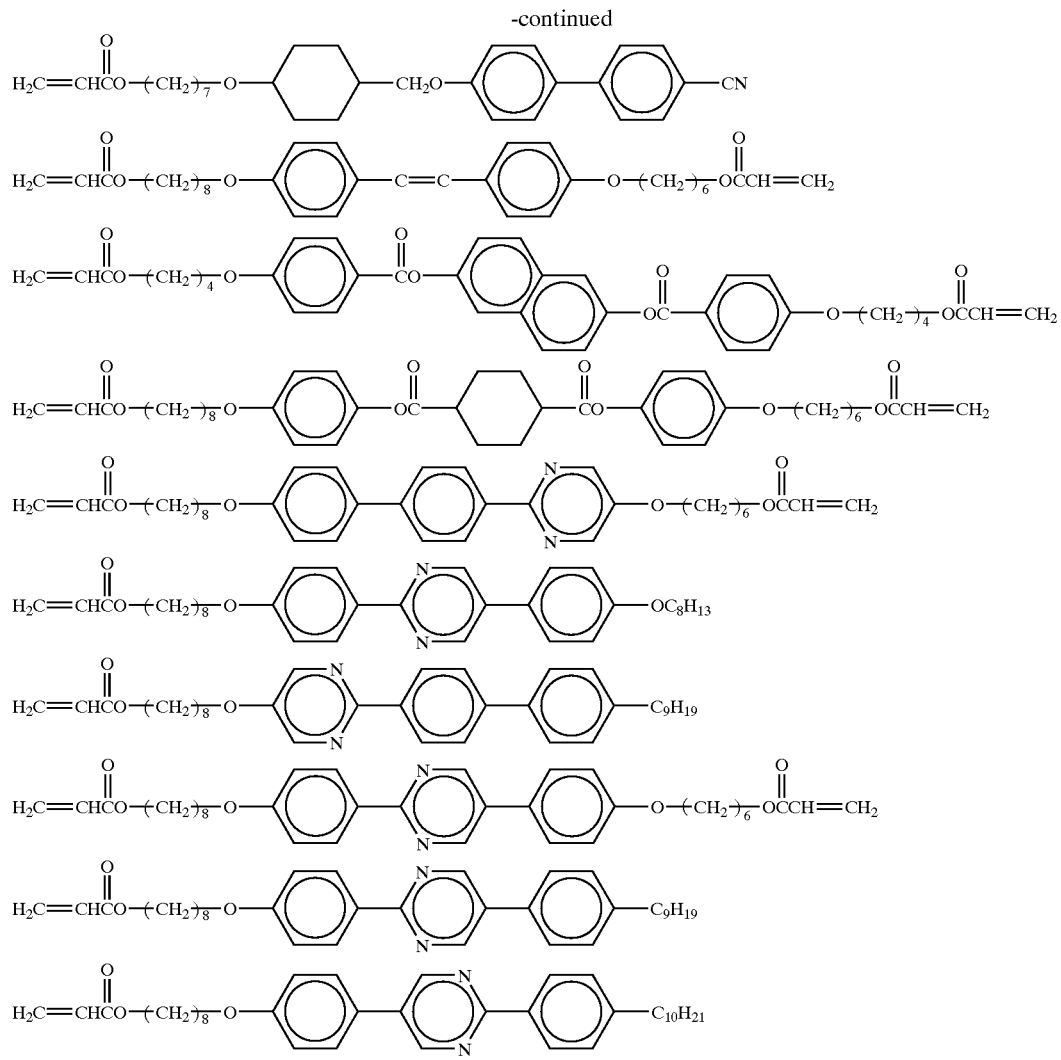

In the present invention it is preferable if the chiral smectic texture of the helical configuration layer is formed on the transparent substrates. Cellulose-type resins, norbornene-type resins and polycarbonate-type resins are preferable as materials for the transparent substrates. Further, although in the polarizing element 10 a pair of base plates is used, it is possible to use a single base plate or even no base plates. The aligning material, which puts the liquid crystal molecules into the specified orientation, may be formed on the transparent substrates. A film of a high polymer such as a polyimide polymer, a polyvinyl alcohol polymer or the like can be used as the aligning material.

The polarizing element of the present invention includes a polarizer. Because the polarizing element of the present invention includes this polarizer, which is a polarizing plate or the like, an undesired light component (the s-polarized light component in the previous example) can be more reliably excluded. Therefore, the polarizing element of the present invention can be utilized in a liquid crystal screen display that requires a high degree of polarization. When the polarizer is used, the polarizer and the layer of liquid crystal molecules are disposed such that the transmission axis t of the polarizer and the axis orthogonal projection s' of the liquid crystal laser intersect substantially at 90°. Specifically, an angle of intersection of the axis orthogonal projection s' and the transmission axis t is preferably from 60° to 120°, more preferably from 80° to 100° and particularly preferably from 85° to 95°.

A conventionally known polarizing plate can be used as the polarizer in the present invention. Of conventionally known polarizing plates, an iodine-type, dye-type or polyvinylene-type polarizing plate having a degree of polarization of at least 98% is preferable. Further, a protective film for protecting the polarizing plate may be formed thereon, which protective film may be used both for protection of the polarizing plate and as one of the aforementioned transparent substrates.

The polarizing element of the present invention can be utilized in display devices in a variety of fields, such as personal computers, audio-visual equipment, mobile data communication devices, video games, simulation devices, car navigation systems and the like.

EXAMPLES

The effects of the present invention are described in more detail below, by means of an Example. However, the present invention is not limited in any way by this Example.

Example 1

The polarizing element 10 was prepared with the same structure as in FIG. 1 (except that the transparent substrate 12 was provided only at a light incident side of the layer 14).

First, an aligning material (thickness: 0.5 μm) of 95% saponified polyvinyl alcohol (PVA) was formed on a 150 μm thickness plate of cellulose triacetate (the transparent substrate 12). A rubbing treatment was performed on this aligning material. (The direction of rubbing was the y direction of FIG. 2.) Next, a bar coater coated the aligning material with a coating solution having the composition described below, and orientation curing was performed at 50° C. for 4 minutes. Then, ultraviolet irradiation was applied, at room temperature, using a high-pressure mercury lamp, and polymer hardening was performed on the coating. Thus, the layer 14 was formed. The thickness of the formed layer 14 was 5 μm.

Coating solution composition;

| | |
|---|---|
| Compound 1 (described below) (liquid crystal molecule) | 10 parts by weight |
| Compound 2 (described below) (liquid crystal molecule) | 30 parts by weight |
| Compound 3 (described below) (liquid crystal molecule) | 17 parts by weight |
| Compound 4 (described below) (liquid crystal molecule) | 10 parts by weight |
| Compound 5 (described below) (liquid crystal molecule) | 10 parts by weight |
| IRGACURE 907 (manufactured by Ciba-Geigy AG) | 3 parts by weight |
| Chloroform | 600 parts by weight |

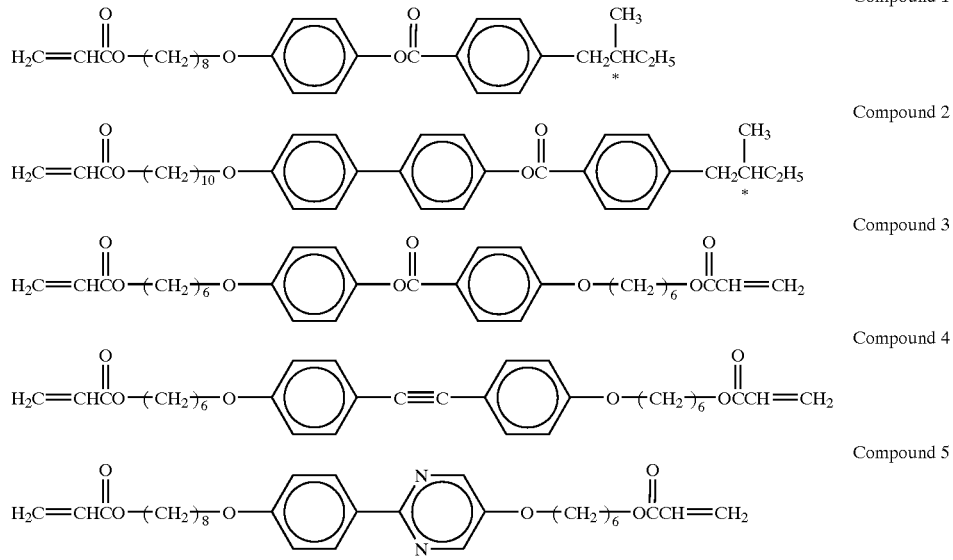

When a structural examination of the formed layer 14 was carried out using a polarizing microscope, linear chiral smectic C phases along the x direction of FIG. 2 were present at the surface of the layer 14 (the x-y plane of FIG. 2). Characteristic dechiralization lines occurred at regular intervals (2.0 μm). In other words, it could be confirmed that the formed layer 14 was composed of a chiral smectic C phase having a axis s substantially parallel to the surface of the layer 14 (θ=0°, φ=0°). A helical pitch of this chiral smectic C phase was 2.0 μm, corresponding to the dechiralization interval.

Then, the polarizing plate 16 was multiply disposed at the layer 14, the polarizing element 10 was prepared, and optical functions thereof examined. The polarizing plates 16 were iodine-type polarizing plates with a degree of polarization of 99%. Positional relationships between the transmission axes t of the polarizing plates 16 and the axis orthogonal projection s' of the layer 14 are conceptually illustrated in FIGS. 3A through 3F.

Figure 3A:
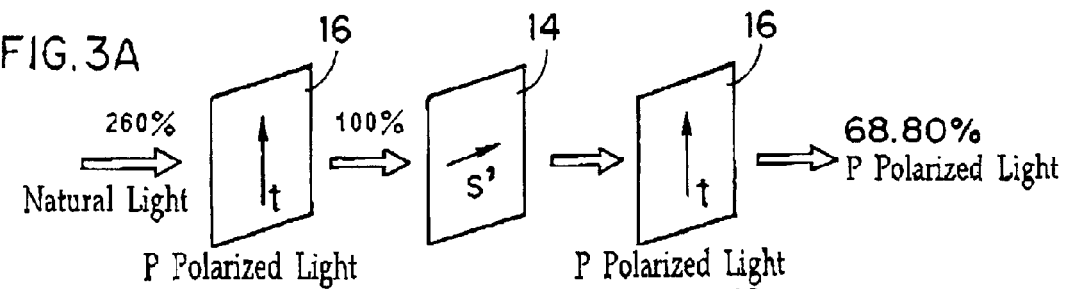
FIG. 3A is a schematic diagram of a polarizing element prepared for an Example.
Figure 3B:
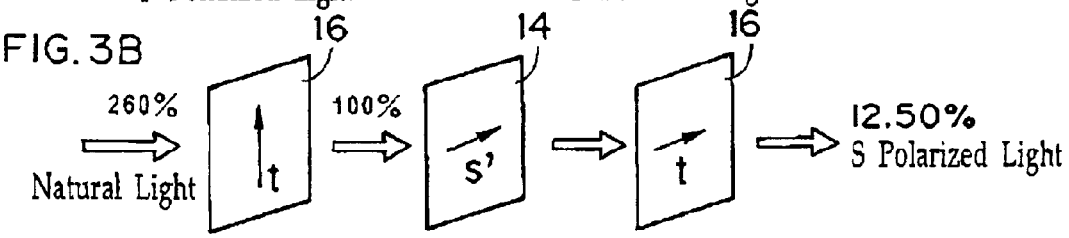
FIG. 3B is a schematic diagram of a polarizing element prepared for the Example.

First, as shown in FIG. 3A, the two polarizing plates 16 were disposed such that the orthogonal projection s' of the axis of the liquid crystal layer onto the transparent substrate 12 surface was perpendicular to the transmission axes t of the two polarizing plates sandwiching the layer 14. Natural light was incident upon the polarizing plate 16 at an incident side in an amount of 260%, p-polarized light was incident on the layer 14 in an amount of 100%, and p-polarized light was emitted from the polarizing plate 16 disposed at an emission side in an amount of 68.8%. On the other hand, when the polarizing plate 16 at the emission side was disposed such that the transmission axis thereof was parallel to the axis orthogonal projection s' with the polarizing plate 16 at the incident side being left unaltered, as shown in FIG. 3B, s-polarized light was emitted in an amount of 12.5%. Prom these results it can be seen that the layer 14 transmitted almost all p-polarized light incident thereon.

Figure 3C:
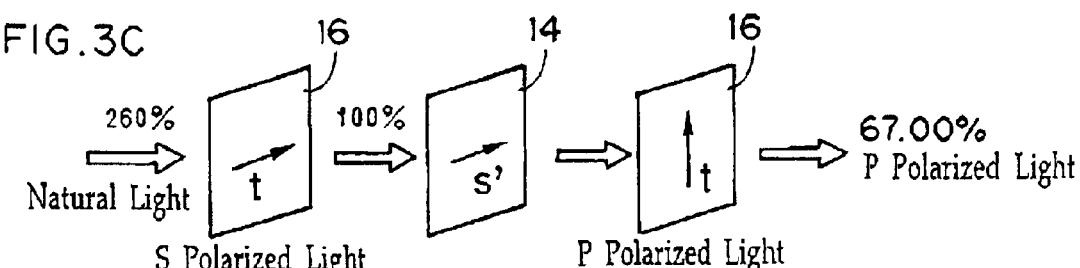
FIG. 3C is a schematic diagram of a polarizing element prepared for the Example.
Figure 3D:
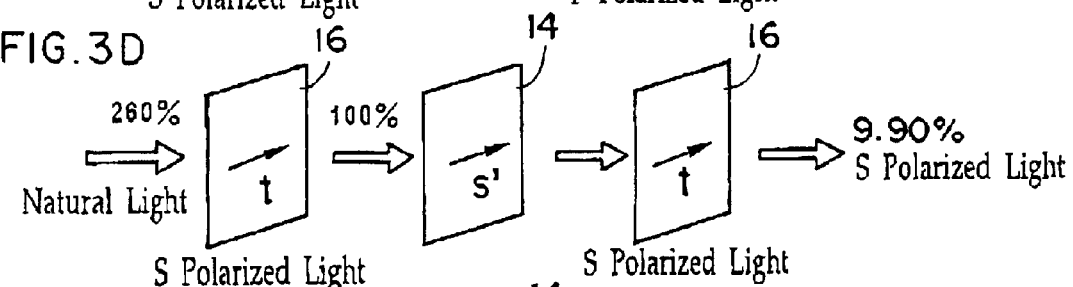
FIG. 3D is a schematic diagram of a polarizing element prepared for the Example.

Then, as shown in FIG. 3C, the polarizing plates 16 were disposed such that the transmission axis t of the incident side polarizing plate 16 was parallel to the axis orthogonal projection s' and the transmission axis t of the emission side polarizing plate 16 was perpendicular to the same. Natural light was incident in the amount of 260%, s-polarized light was incident on the layer 14 in an amount of 100%, and p-polarized light was emitted from the emission side polarizing plate 16 in an amount of 67.0%. On the other hand, when the polarizing plates 16 were disposed such that the transmission axes t thereof were both parallel to the axis orthogonal projection s', s-polarized light was obtained in an amount of 9.9%. From these results it can be seen that s-polarized light incident on the layer 14 was almost entirely converted to p-polarized light in a single pass.

Figure 3E:
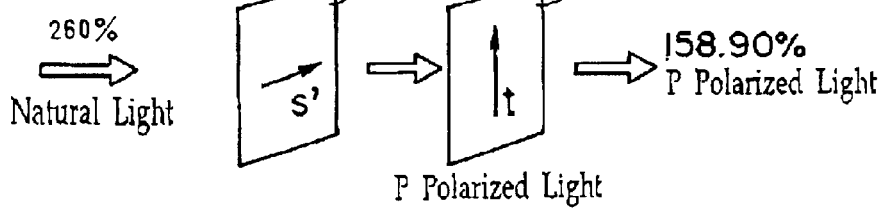
FIG. 3E is a schematic diagram of a polarizing element prepared for the Example.
Figure 3F:
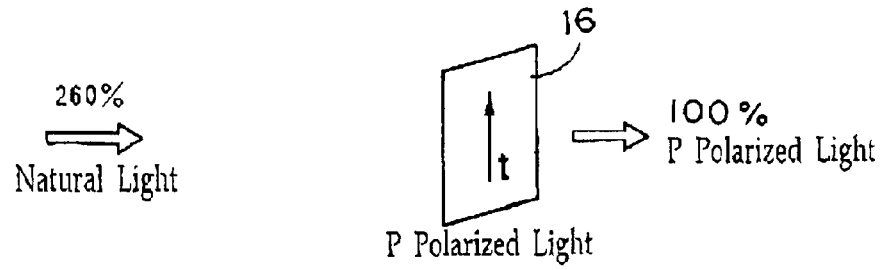
FIG. 3F is a schematic diagram of a polarizing element prepared for the Example.

Finally, as shown in FIG. 3E, the incident side polarizing plate 16 was removed and the emission side polarizing plate 16 disposed such that the transmission axis t thereof was perpendicular to the axis orthogonal projection s' of the layer 14. Natural light was incident in the amount of 260%, and p-polarized light was emitted from the polarizing plate 16 in an amount of 158.9%. In a state in which the layer 14 was not present, as shown in FIG. 3F, natural light in the amount of 260% was reduced to p-polarized light in an amount of 100% by the polarizing plate 16. From these results it can be seen that the layer 14 transmitted almost all of a p-polarized light component included in the incident natural light, and converted almost all of a corresponding s-polarized light component into a p-polarized light component. That is, it was verified that the layer 14 highly efficiently converted natural light to p-polarized light in a single pass.

What is claimed is:

1. A polarizing element comprising:

a layer including liquid crystal molecules; and a polarizer having a transmission axis, wherein the liquid crystal molecules have a chiral smectic texture of a helical configuration, an axis of a molecular helix of the helical configuration of each of the liquid crystal molecules is along a direction other than a direction normal to a surface of the layer, and a direction of an orthogonal projection of the axis onto the surface of the layer is substantially at 90° with respect to the transmission axis of the polarizer.

2. The polarizing element of claim 1, wherein the layer has a chiral smectic C texture.

3. The polarizing element of claim 2, wherein the chiral smectic texture of the helical configuration is formed by liquid crystal molecules which are fixed one of physically and by a chemical reaction.

4. The polarizing element of claim 1, wherein the chiral smectic texture is formed by liquid crystal molecules to be fixed one of physically and by a chemical reaction.

5. The polarizing element of claim 1, wherein the polarizer is one of an iodine-type polarizing plate, a dye-type polarizing plate and a polyvinylene-type polarizing plate, and the polarizer has a degree of polarization of at least 98%.

6. The polarizing element of claim 1, wherein the layer is formed on a transparent substrate.

7. The polarizing element of claim 6, wherein the transparent substrate is formed by one of a cellulose-type resin, a norbornene-type resin and a polycarbonate-type resin.

8. The polarizing element of claim 6, wherein the transparent substrate also serves as a protective film for the polarizer.

9. The polarizing element of claim 1, wherein, of natural light that is incident from the direction normal to the surface of the layer, a linearly polarized light component whose vibration direction is substantially at 90° to the orthogonal projection is transmitted and a vibration direction of a linearly polarized light component whose vibration direction is substantially parallel to the orthogonal projection is substantially altered by 90° to be transmitted.

10. The polarizing element of claim 1, wherein the axis forms an oblique angle of from 5° to 90° with respect to the direction normal to the surface of the layer.

11. A polarizing element comprising:

a layer including liquid crystal molecules; and a polarizer having a transmission axis, wherein, the liquid crystal molecules have a chiral smectic C texture of a helical configuration, an axis of a molecular helix of the helical configuration of each of the liquid crystal molecules is along a direction other than a direction normal to a surface of the layer, a direction of an orthogonal projection of the axis onto the surface of the layer is substantially at 90° with respect to the transmission axis of the polarizer, and, of natural light that is incident from the direction normal to the surface of the layer, a linearly polarized light component whose vibration direction is substantially at 90° to the orthogonal projection is transmitted and a vibration direction of a linearly polarized light component whose vibration direction is substantially parallel to the orthogonal projection is substantially altered by 90° to be transmitted.

12. The polarizing element of claim 11, wherein the chiral smectic C texture is formed by liquid crystal molecules to be fixed one of physically and by a chemical reaction.

* * * * *